US009211855B2

(12) United States Patent
Hara et al.

(10) Patent No.: US 9,211,855 B2
(45) Date of Patent: Dec. 15, 2015

(54) VEHICLE POWER SUPPLY DEVICE

(71) Applicant: HONDA MOTOR CO., LTD., Tokyo (JP)

(72) Inventors: Yasuhiro Hara, Dublin, OH (US);
Hideto Yamamoto, Haga-gun (JP);
Tomohiro Arakawa, Haga-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/314,169

(22) Filed: Jun. 25, 2014

(65) Prior Publication Data
US 2015/0012175 A1    Jan. 8, 2015

(30) Foreign Application Priority Data

Jul. 2, 2013    (JP) ................................. 2013-139147

(51) Int. Cl.
| G06F 7/00 | (2006.01) |
| B60L 9/00 | (2006.01) |
| B60L 1/00 | (2006.01) |
| B60R 16/03 | (2006.01) |
| B60L 11/18 | (2006.01) |
| B60W 10/06 | (2006.01) |

(Continued)

(52) U.S. Cl.
CPC ............ *B60R 16/03* (2013.01); *B60L 11/1868* (2013.01); *B60W 10/06* (2013.01); *B60W 10/08* (2013.01); *B60W 10/26* (2013.01); *B60W 20/00* (2013.01); *B60W 30/18127* (2013.01); *F02N 11/0866* (2013.01); *H02J 7/1423* (2013.01); *B60L 11/08* (2013.01); *B60L 2210/10* (2013.01); *B60W 2510/0623* (2013.01)

(58) Field of Classification Search
USPC ........................................ 701/36, 22; 307/9.1
See application file for complete search history.

(56) References Cited

U.S. PATENT DOCUMENTS

| 6,048,289 A * | 4/2000 | Hattori et al. .................... 477/15 |
| 2004/0055305 A1 * | 3/2004 | Kuroda et al. .................. 60/698 |

(Continued)

FOREIGN PATENT DOCUMENTS

| JP | 2008-312404 | 12/2008 |
| JP | 2009-126395 | 6/2009 |

(Continued)

OTHER PUBLICATIONS

Japanese Office Action with English Translation, dated Apr. 21, 2015, 4 pages.

*Primary Examiner* — Thomas G Black
*Assistant Examiner* — Tyler Paige
(74) *Attorney, Agent, or Firm* — Rankin, Hill & Clark LLP

(57) ABSTRACT

When the fuel supply to an internal combustion engine has stopped due to a vehicle starting to decelerate or the like, and the speed of the vehicle is greater than a predetermined speed, then a controller causes a power generator to operate in a first power generating mode. The controller charges a capacitor by using regenerative power that is output from the power generator to supply power from the power generator via the capacitor via a DC-DC converter. When the stopping of the fuel supply to the internal combustion engine is cancelled as a result of the engine revolution speed reaching a predetermined revolution speed (for example, an idling revolution speed) in conjunction with the speed of the vehicle dropping to the predetermined speed, the power generator can be kept in the first power generating mode.

4 Claims, 15 Drawing Sheets

(51) Int. Cl.
*B60W 10/08* (2006.01)
*B60W 10/26* (2006.01)
*B60W 20/00* (2006.01)
*B60W 30/18* (2012.01)
*H02J 7/14* (2006.01)
*F02N 11/08* (2006.01)
*B60L 11/08* (2006.01)

(56) References Cited

U.S. PATENT DOCUMENTS

| | | |
|---|---|---|
| 2004/0112320 A1 | 6/2004 | Bolz et al. |
| 2004/0155121 A1* | 8/2004 | Watanabe et al. .......... 239/533.2 |
| 2006/0076914 A1* | 4/2006 | Yaguchi ........................ 318/432 |
| 2006/0222910 A1* | 10/2006 | Aoyagi et al. .................. 429/12 |
| 2007/0032915 A1* | 2/2007 | Yamaguchi ........................ 701/1 |
| 2008/0059013 A1* | 3/2008 | Liu et al. ......................... 701/22 |
| 2010/0025127 A1* | 2/2010 | Oyobe ....................... 180/65.22 |
| 2015/0008731 A1* | 1/2015 | Takahashi et al. ............. 307/9.1 |
| 2015/0008734 A1* | 1/2015 | Ishida et al. .................. 307/10.1 |
| 2015/0012175 A1* | 1/2015 | Hara et al. ...................... 701/36 |

FOREIGN PATENT DOCUMENTS

| | | |
|---|---|---|
| JP | 2010-195336 | 9/2010 |
| JP | 2013-023103 | 2/2013 |

* cited by examiner

VEHICLE POWER SUPPLY DEVICE

CROSS-REFERENCE TO RELATED APPLICATION

Priority is claimed on Japanese Patent Application No. 2013-139147, filed Jul. 2, 2013, the contents of which are incorporated herein by reference.

BACKGROUND

1. Field of the Invention

The present invention relates to a vehicle power supply device.

2. Description of Related Art

Conventionally, a vehicle power supply device is known in which a DC-DC converter is connected between a main power supply, to which an electrical load is connected, and an auxiliary power supply, to which a power generator is connected, and a switch is provided between the main power supply and the auxiliary power supply (see, for example, Japanese Unexamined Patent Application Publication (JP-A) No. 2010-195336).

SUMMARY

However, according to the power supply for a vehicle according to the above-described conventional technology, it is desirable that fuel consumption be improved by improving the relationship between the stopping of the fuel supply to the internal combustion engine when the vehicle is decelerating or the like and the controlling of the transfer of power between the main power supply, the auxiliary power supply, and the power generator.

Aspects of the present invention were conceived in view of the above-described circumstances, and it is an object thereof to provide a vehicle power supply device that makes it possible to improve fuel consumption by improving the relationship between the stopping of the fuel supply to an internal combustion engine and the controlling of power transfers between a first power supply, a second power supply, and a power generator.

In order to solve the above-described problems and achieve the relevant objectives, the present invention employs the following aspects.

(1) A vehicle power supply device according to an aspect of the present invention is mounted in a vehicle provided with an internal combustion engine and is provided with: a first power supply; a second power supply that is connected in parallel to the first power supply; a DC-DC converter that is connected between the first power supply and the second power supply; a determination device that determines whether or not a fuel supply to the internal combustion engine has stopped; a deceleration detecting device that detects a deceleration of the vehicle; and a control device that controls the DC-DC converter, wherein, when it is determined by the determination device that the fuel supply to the internal combustion engine has stopped, the control device charges the second power supply using regenerative power that is supplied to the second power supply via the DC-DC converter, and, when a deceleration of the vehicle is detected by the deceleration detecting device, and it is also determined by the determination device that the fuel supply to the internal combustion engine has not been stopped, the control device is able to charge the second power supply using regenerative power that is supplied to the second power supply via the DC-DC converter (2) In the above-described aspect (1), it is also possible for there to be provided a power generator that is able to operate in at least a first power generating mode and a second power generating mode that generates voltage that is smaller than the voltage generated in the first power generating mode, and that operates in the first power generating mode when it is determined by the determination device that the fuel supply to the internal combustion engine has been stopped, and, when a deceleration of the vehicle is detected by the deceleration detecting device, and it is also determined by the determination device that the fuel supply to the internal combustion engine has not been stopped, for the control device to cause the power generator to operate in the first power generating mode.

(3) In the above-described aspect (1) or (2), it is also possible for the control device to set the output voltage from the second power supply to a first voltage when it is determined by the determination device that the fuel supply to the internal combustion engine has stopped, and to set the output voltage from the second power supply to a second voltage which is smaller than the first voltage when it is determined by the determination device that the fuel supply to the internal combustion engine has not stopped, and, when the control device changes the output voltage from the second power supply from the first voltage to the second voltage, for the control device to charge the first power supply by supplying power obtained from the difference between the first voltage and the second voltage to the first power supply.

According to the above-described aspect (1), by charging the second power supply, if this is possible, not only when the supply of fuel to an internal combustion engine is stopped, but even during a deceleration when the stopping of the fuel supply has been cancelled (for example, immediately prior to the vehicle stopping), it is possible to improve the fuel consumption.

In the case of the above-described aspect (2), by causing the power generator to operate in a first power generating mode even while the vehicle is decelerating, during which time the stopping of the fuel supply is cancelled (for example, immediately prior to the vehicle stopping), it is possible to prevent a decrease in engine braking. As a result of this, it is possible, for example, to prevent any brake heat from being generated as a result of the brakes being used in place of engine braking, and to thereby prevent any decrease in the amount of regenerative power that can be recovered by the power generator.

In the case of the above-described (3), it is possible to improve fuel consumption by supplying power from the second power supply to the first power supply.

DESCRIPTION OF THE EMBODIMENT

Hereinafter, a vehicle power supply device according to an embodiment of the present invention will be described with reference made to the appended drawings.

Figure 1:
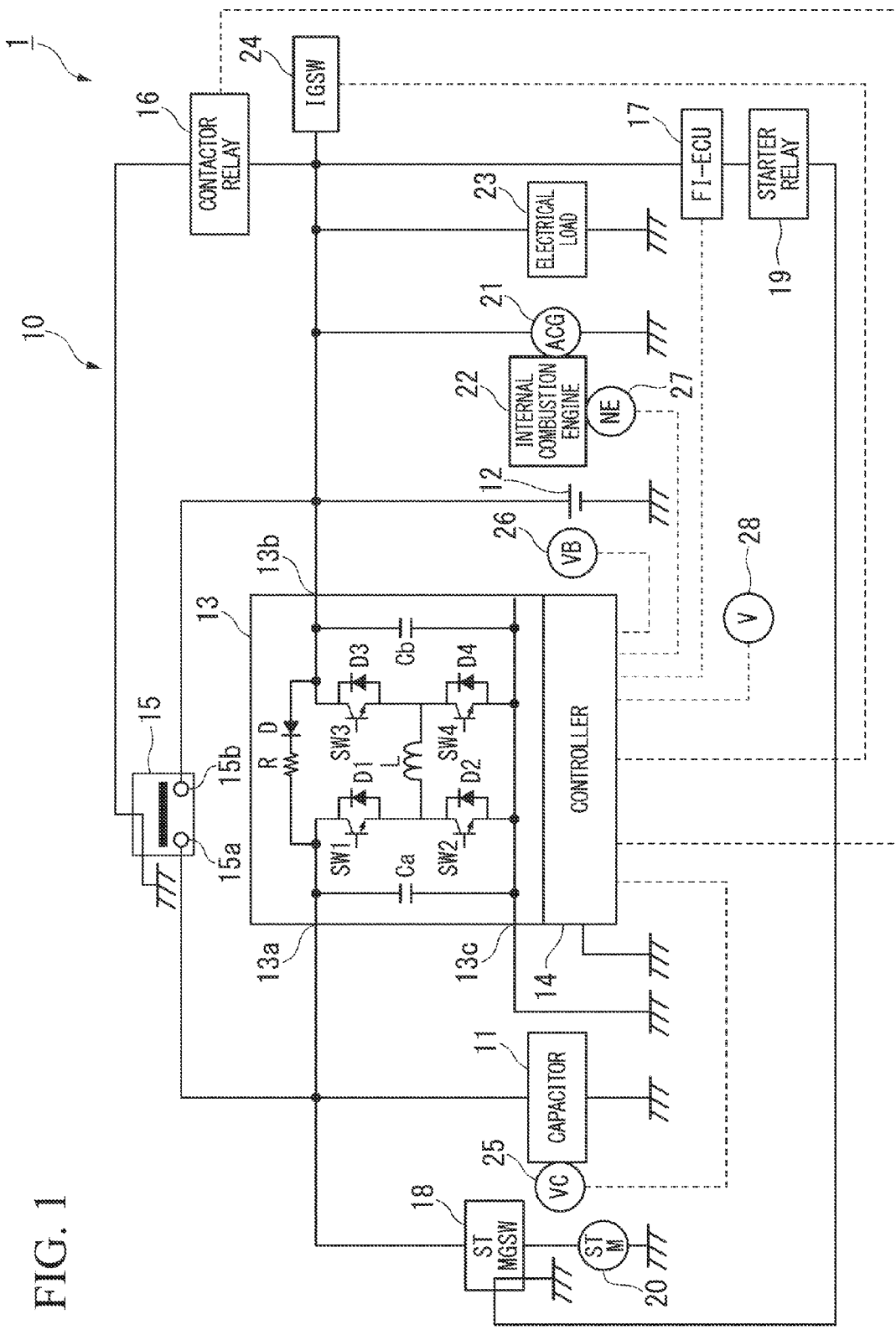
FIG. 1 is a structural view of a vehicle power supply device according to an embodiment of the present invention, and of a vehicle in which this vehicle power supply device has been mounted.

As is shown, for example, in FIG. 1, a vehicle power supply device 10 according to the present embodiment is mounted in a vehicle 1. The vehicle power supply device 10 is provided with, at least, a capacitor 11 (i.e., a second power supply) that serves as a secondary battery and a battery 12 (i.e., a first power supply), a DC-DC converter 13 and a controller 14 (i.e., determination device, deceleration detecting device, control device), and with a contactor 15 and a contactor relay 16.

The vehicle 1 is provided with the vehicle power supply device 10, an FI-ECU 17, a starter magnet switch (ST-MGSW) 18, a starter relay 19, a starter motor (STM) 20, a power generator (ACG) 21 and an internal combustion engine 22, an electrical load 23, an ignition switch (IGSW) 24, a first voltage sensor 25 and a second voltage sensor 26, a revolution sensor 27, and a speed sensor 28.

The capacitor 11 may be formed, for example, by an electric double layer capacitor, an electrolytic capacitor, or a lithium ion capacitor or the like, and is connected to the starter magnet switch 18. The capacitor 11 is connected to a first input/output terminal 13a of the DC-DC converter 13, and to a first terminal 15a of the contactor 15. The capacitor 11 is able to be electrically connected to the battery 12, the contactor relay 16, the FI-ECU 17, the power generator 21, the electrical load 23, and the ignition switch 24 via the DC-DC converter 13 or the contactor 15.

The battery 12 may be, for example, a lead battery having a predetermined voltage (12V or the like), and is connected to the contactor relay 16, the FI-ECU 17, the power generator 21, the electrical load 23, and the ignition switch 24. The battery 12 is also connected to a second input/output terminal 13b of the DC-DC converter 13, and to a second terminal 15b of the contactor 15. The battery 12 is able to be electrically connected to the capacitor 11 and the starter magnet switch 18 via the DC-DC converter 13 or the contactor 15.

The DC-DC converter 13 is able to boost or lower the voltage two-directionally between the first and second input/output terminals 13a and 13b depending on the control performed by the controller 14. The DC-DC converter 13 charges the capacitor 11 by supplying generated power that is generated by the power generator 21 when the internal combustion engine 22 is running, or regenerative power that is generated by the power generator 21 when the vehicle 1 is braking to the capacitor 11. Moreover, the DC-DC converter 13 discharges the capacitor 11 by supplying the power accumulated in the capacitor 11 to at least the battery 12 or the electrical load 23.

The DC-DC converter 13 may be, for example, an H-bridge voltage inverter type of DC-DC converter, and is provided with four (namely, a first through a fourth) switching elements (for example, IGBT: Insulated Gate Bipolar mode Transistors) SW1, SW2, SW3, and SW4 that are bridge-connected.

The first and second switching elements SW1 and SW2 that form a pair are connected in series between the first input/output terminal 13a and a ground terminal 13c. In other words, a collector of the first switching element SW1 is connected to the first input/output terminal 13a, while an emitter of the first switching element SW1 is connected to a collector of the second switching element SW2, and an emitter of the second switching element SW2 is connected to the ground terminal 13c.

The third and fourth switching elements SW3 and SW4 that form a pair are connected in series between the second input/output terminal 13b and the ground terminal 13c. In other words, a collector of the third switching element SW3 is connected to the second input/output terminal 13b, while an emitter of the third switching element SW3 is connected to a collector of the fourth switching element SW4, and an emitter of the fourth switching element SW4 is connected to the ground terminal 13c.

First through fourth diodes D1 through D4 are connected respectively between the emitter and collector of each of the switching elements SW1, SW2, SW3, and SW4 and are aligned such that the forward voltage runs from the emitter to the collector.

The DC-DC converter 13 is provided with a reactor L (i.e., a coil L) that is connected between a connection point between the first switching element SW1 and the second switching element SW2 and a connection point between the third switching element SW3 and the fourth switching element SW4. Furthermore, the DC-DC converter 13 is also provided with a first capacitor Ca that is connected between the first input/output terminal 13a and the ground terminal 13c, and a second capacitor Cb that is connected between the second input/output terminal 13b and the ground terminal 13c.

The DC-DC converter 13 is also provided with a resistor R and a diode D that are connected in series so as to directly join the first input/output terminal 13a and the second input/output terminal 13b together. The diode D is aligned such that the forward voltage runs from the second input/output terminal 13b to the first input/output terminal 13a.

The DC-DC converter 13 is driven by signals that are output from the controller 14 and are input into gates of the respective switching elements SW1, SW2, SW3, and SW4.

The controller 14 controls the two-directional voltage boosting and lowering operations of the DC-DC converter 13, and the operations to connect or disconnect the contactor 15 by the contactor relay 16. Furthermore, the controller 14 controls whether or not the FI-ECU 17 is allowed to execute an idle stop or is prohibited from executing an idle stop, and outputs to the FI-ECU 17 a control command that either allows it to execute an idle stop or prohibits it from executing an idle stop.

The controller 14 detects the internal resistance and electrostatic capacity of the capacitor 11, and is able to both determine whether or not the internal resistance is equal to or greater than a predetermined value, and to determine whether there is any deterioration in the capacitor 11 in accordance with this internal resistance. The controller 14 is connected to a first voltage sensor 25 that detects an output voltage VC from the capacitor 11, a current sensor (not shown) that detects the charge current and the discharge current of the capacitor 11, and a temperature sensor (not shown) that detects the temperature of the capacitor 11.

The controller 14 is also able to control discharges from the battery 12 and the depth of discharges from the battery 12. The controller 14 is connected to a second voltage sensor 26 that detects an output voltage VB from the battery 12, a current sensor (not shown) that detects the charge current and the discharge current of the battery 12, and a temperature sensor (not shown) that detects the temperature of the battery 12.

The contactor 15 switches the first and second terminals 15a and 15b of the contactor 15 between a state in which they are connected together and state in which they are disconnected from each other in accordance with the contactor relay 16 being turned on or off. This turning on and off of the contactor relay 16 is controlled by the controller 14.

Note that the first terminal 15a of the contactor 15 is connected to the first input/output terminal 13a of the DC-DC converter 13, a positive polarity terminal of the capacitor 11, and the starter magnet switch 18. The second terminal 15b of the contactor 15 is connected to the second input/output terminal 13b of the DC-DC converter 13, the positive polarity terminal of the battery 12, and the power generator 21 and electrical load 23. As a result of these connections, when it is in a connected state the contactor 15 connects both the capacitor 11 and the battery 12 in parallel to the starter magnet switch 18 and starter motor 20 that are connected together in series. Note that negative polarity terminals of the capacitor 11 and battery 12 are grounded.

The FI-ECU 17 is an ECU (Electronic Control Unit) that is formed, for example, by an electronic circuit such as a CPU (Central Processing Unit) or the like, and performs various types of control relating to operations of the internal combustion engine 22 such as fuel supply, ignition timing, and the like. The FI-ECU 17 controls the starting and stopping of the internal combustion engine 22 by means of start request and stop requests signals that are output from the ignition switch 24 in accordance with operations performed by a driver.

The FI-ECU 17 controls the idle stopping of the internal combustion engine 22. In an idle stop, an internal combustion engine 22 that is currently running is temporarily stopped automatically if predetermined temporary stop conditions are established, and an internal combustion engine 22 that has been temporarily stopped is automatically restarted if predetermined restore conditions are established. The predetermined temporary stop conditions may be, for example, the speed of the vehicle 1 dropping to zero at the same time as the accelerator pedal opening angle is zero and the brake pedal switch is turned on. The predetermined restore conditions may be, for example, the brake pedal switch being turned off.

The FI-ECU 17 starts the internal combustion engine 22 by controlling the starter relay 19 such that this is turned on. It does this in accordance with a start request via a signal output from the ignition switch 24, or in accordance with a restore request from a temporary stop state arising from an idle stop. The FI-ECU 17 controls the power generating operations of the power generator (ACG) 21, and arbitrarily alters the voltage of the power generated by the power generator 21.

The power generator 21 is an AC power generator that is linked by means of, for example, a belt or the like to a crankshaft (not shown) of the internal combustion engine 22. The power generator 21 is able to output generated power by generating this power using the motive power generated when the internal combustion engine 22 is running. The power generator 21 converts the kinetic energy of the vehicle that is transmitted from a drive wheel (not shown) of the vehicle 1 when the vehicle 1 is decelerating or when it is traveling while the fuel supply has been stopped into electrical energy (i.e., regenerative energy), and then outputs this regenerative power. Note that the power generator 21 is provided with a rectifier (not shown) and the like that rectifies the AC power created by power generation or by regeneration into DC power.

The power generator 21 is grounded and is also connected to the second input/output terminal 13b of the DC-DC converter 13.

The power generator 21 is able to operate under the control of the controller 14 in at least a first power generating mode and a second power generating mode whose generated voltage is less than the voltage generated in the first power generating mode. The power generator 21 operates in the first power generating mode when, for example, it has been determined that the supply of fuel to the internal combustion engine 22 has stopped.

The internal combustion engine 22 is started by means of drive force from the starter motor (STM) 20. The starter motor 20 is driven to rotate by voltage that is supplied from the capacitor 11 or the battery 12 via the starter magnet switch (STMGSW) 18. The starter magnet switch 18 switches between supplying power to the starter motor 20 and not supplying power to the starter motor 20 in accordance with whether or not the starter relay 19 is turned on or off. The turning on and off of the starter relay 19 is controlled by the FI-ECU 17.

The starter motor 20 may be provided, for example, with a pinion gear (not shown) on a rotation shaft (not shown). The internal combustion engine 22 may be provided, for example, with a ring gear (not shown) that is provided on a crankshaft (not shown) and that meshes with the pinion gear of the starter motor 20. As a consequence, the starter motor 20 is able to transmit drive force to the internal combustion engine 22 as a result of the pinion gear thereof meshing with the ring gear on the internal combustion engine 22 side.

The electrical load 23 may be formed by various types of auxiliary equipment. The electrical load 23 is connected to the ground and is also connected to the second input/output terminal 13b of the DC-DC converter 13.

The vehicle power supply device 10 according to the present embodiment is provided with the above-described structure. Next, operations of this vehicle power supply device 10 will be described.

(Charging/Discharging Operations)

Hereinafter, the charging and discharging operations of the capacitor 11 and battery 12 that are controlled by the controller 14 will be described.

The controller 14 causes the voltage output from the capacitor 11 to match a predetermined target voltage that corresponds to the running state of the vehicle 1, and also controls the two-directional voltage boosting/lowering operations of the DC-DC converter 13, and the connecting and disconnecting of the contactor 15 by the contactor relay 16.

As is shown in the following Table 1, the controller 14 executes nine operating modes M0 through M8 as charging/discharging operations of the capacitor 11 and battery 12 that correspond to the running of the vehicle 1.

TABLE 1

| Operating mode | Operation content |
| --- | --- |
| M0: Parked charging | Charge the capacitor while parked |
| M1: Initial start | Turn on ignition switch and starter |
| M2: I/S Preliminary charging | Charge capacitor in preparation for I/S |
| M3: Regenerative charging | Charge capacitor during regeneration |
| M4: Regenerative discharging | Discharge regenerative power and stop ACG |
| M5: I/S Power supply (capacitor) | Discharge power from capacitor to electrical load during I/S |
| M6: I/S Power supply (battery) | Supply power to electrical load from battery |
| M7: ENG Restart | Discharge power from capacitor and restart |
| M8: Parked | Inhibit capacitor deterioration |

Figure 2:
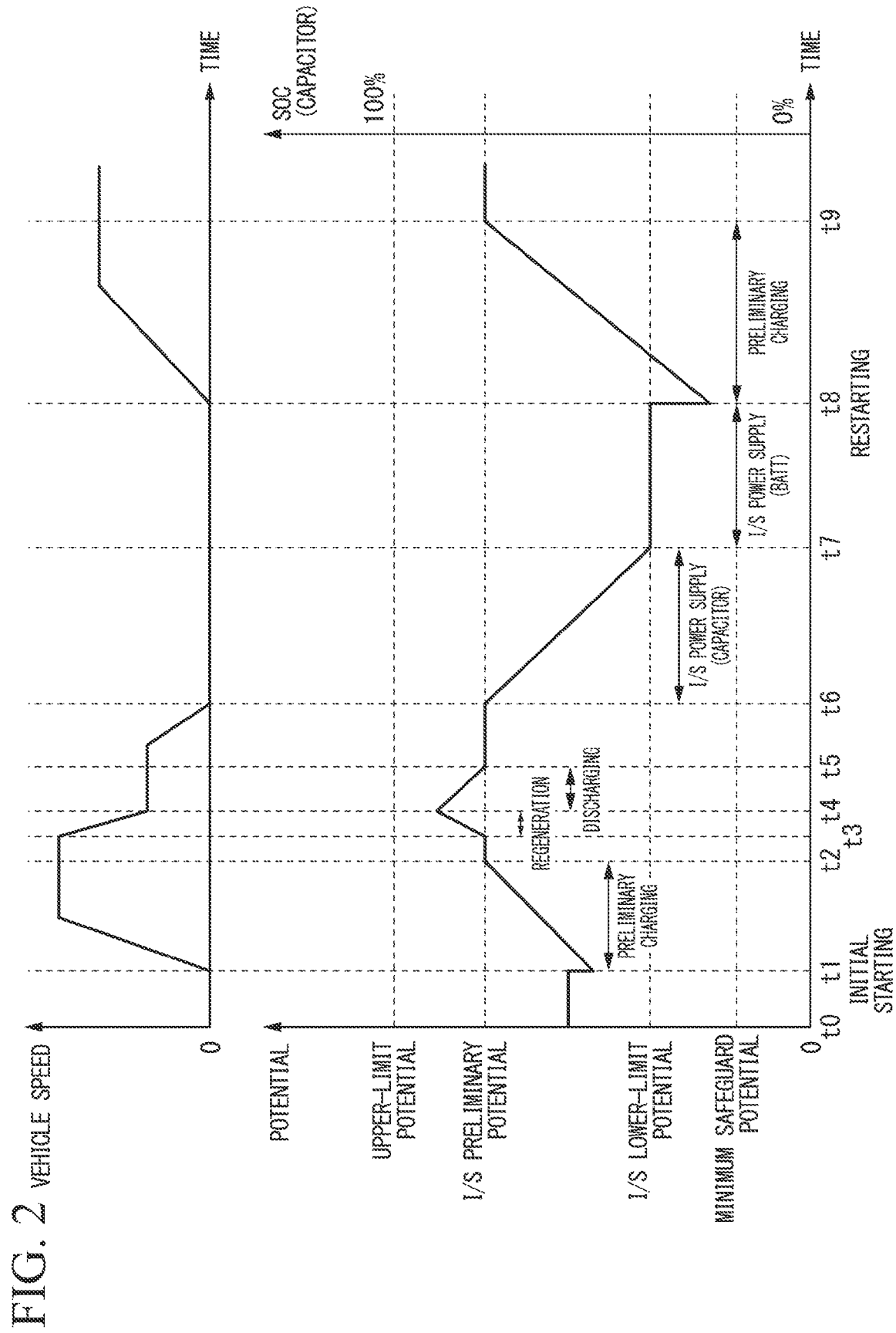
FIG. 2 is a view showing an example of changes in the output voltage of a capacitor that correspond to changes in the operating state of a vehicle in which the vehicle power supply device according to an embodiment of the present invention has been mounted.
Figure 3:
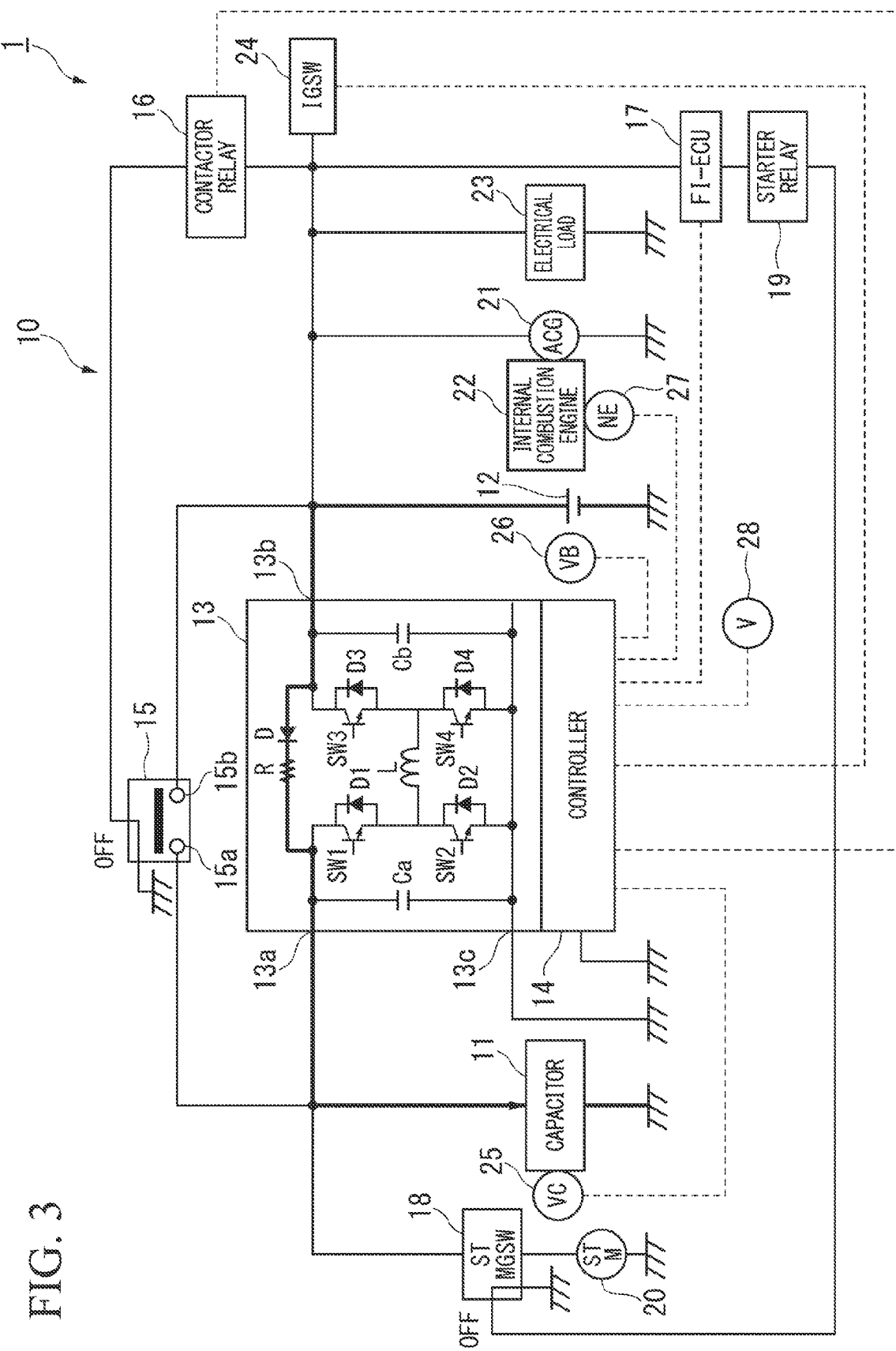
FIG. 3 is a view showing the flow of current in a parked charging operating mode that is executed by a controller of the vehicle power supply device according to an embodiment of the present invention.

Firstly, while the ignition switch 24 is turned off as, for example, during a period from the timing t0 until immediately prior to the timing t1 shown in FIG. 2, the controller 14 executes the parked charging operating mode M0. In this operating mode M0, as is shown in FIG. 3, the controller 14 charges the capacitor 11 using power supplied from the battery 12 to the capacitor 11 via the diode D and resistor R of the DC-DC converter 13. As a result of this, the controller 14 prevents the output voltage from the capacitor 11 (equivalent, for example, to the potential of the positive polarity terminal relative to the grounded negative polarity terminal) from falling too low.

Next, as is the case at the timing t1 shown in FIG. 2, for example, when the controller 14 receives by means of a signal output from the ignition switch 24 a start request requesting that the internal combustion engine 22 be started, the controller 14 first performs a fault detection for the contactor 15 (described below), and then executes the initial start operating mode M1.

In this operating mode M1, firstly, the controller 14 places the contactor 15 in a disconnected state by turning off the contactor relay 16, and then places the starter magnet switch 18 in a connected state by turning on the starter relay 19. As a result of this, the controller 14 drives the starter motor 20 using power supplied only from the capacitor 11.

Figure 4:
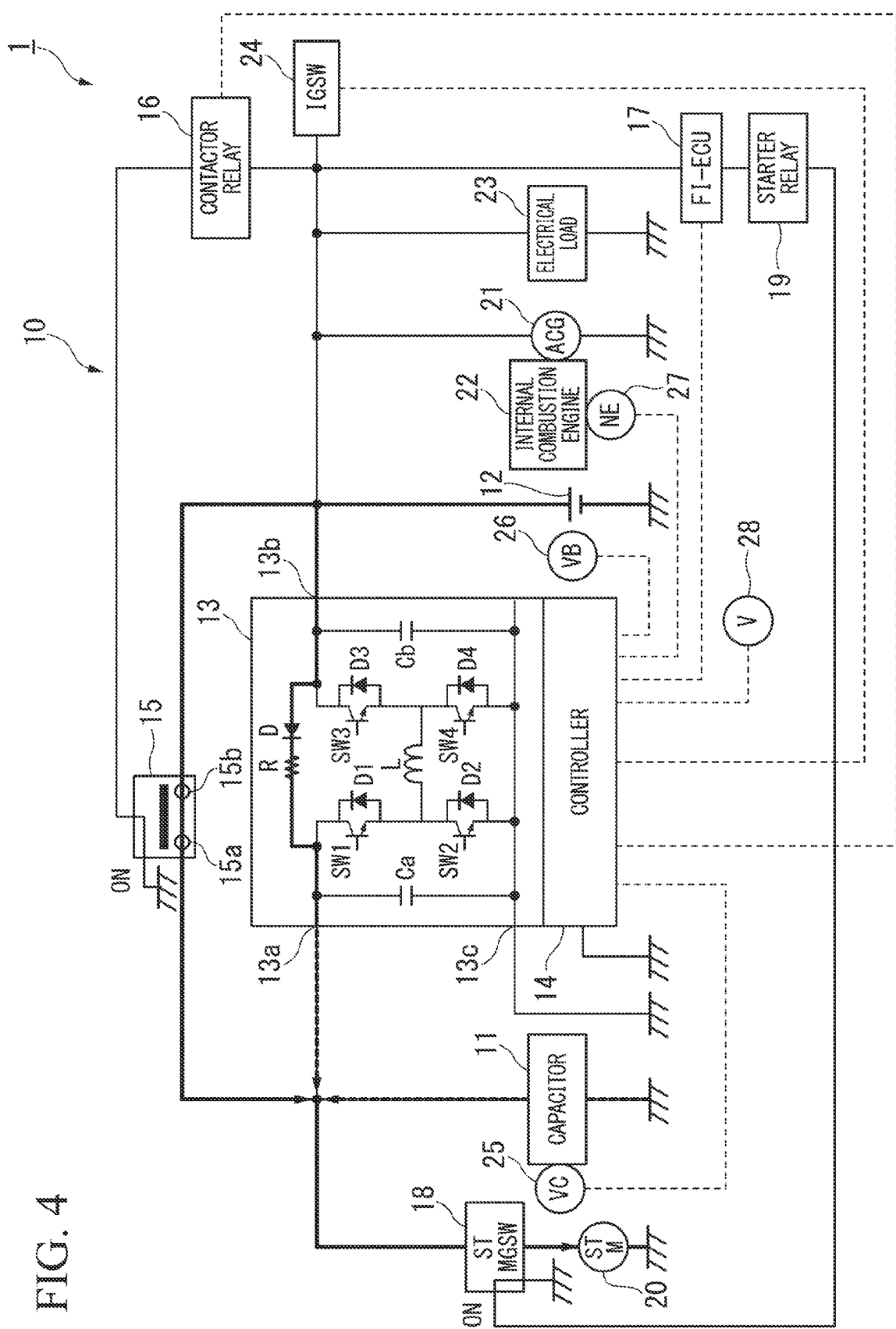
FIG. 4 is a view showing the flow of current in an initial start operating mode that is executed by the controller of the vehicle power supply device according to an embodiment of the present invention.

At this time, when predetermined conditions (described below) are established, the controller 14 places the contactor 15 in a connected state by turning on the contactor relay 16. By doing this, as is shown in FIG. 4, the controller 14 connects both the capacitor 11 and the battery 12 in parallel to the starter magnet switch 18 and starter motor 20, which are connected together in series. The controller 14 then drives the starter motor 20 using power supplied from the capacitor 11 and the battery 12 so that the internal combustion engine 22 is started by drive power from the starter motor 20.

Note that in this initial start operating mode M1, as is the case at, for example, the timing t1 shown in FIG. 2, the output voltage from the capacitor 11 and the residual capacity SOC both decrease due to the power being supplied from the capacitor 11 to the starter motor 20.

Figure 5:
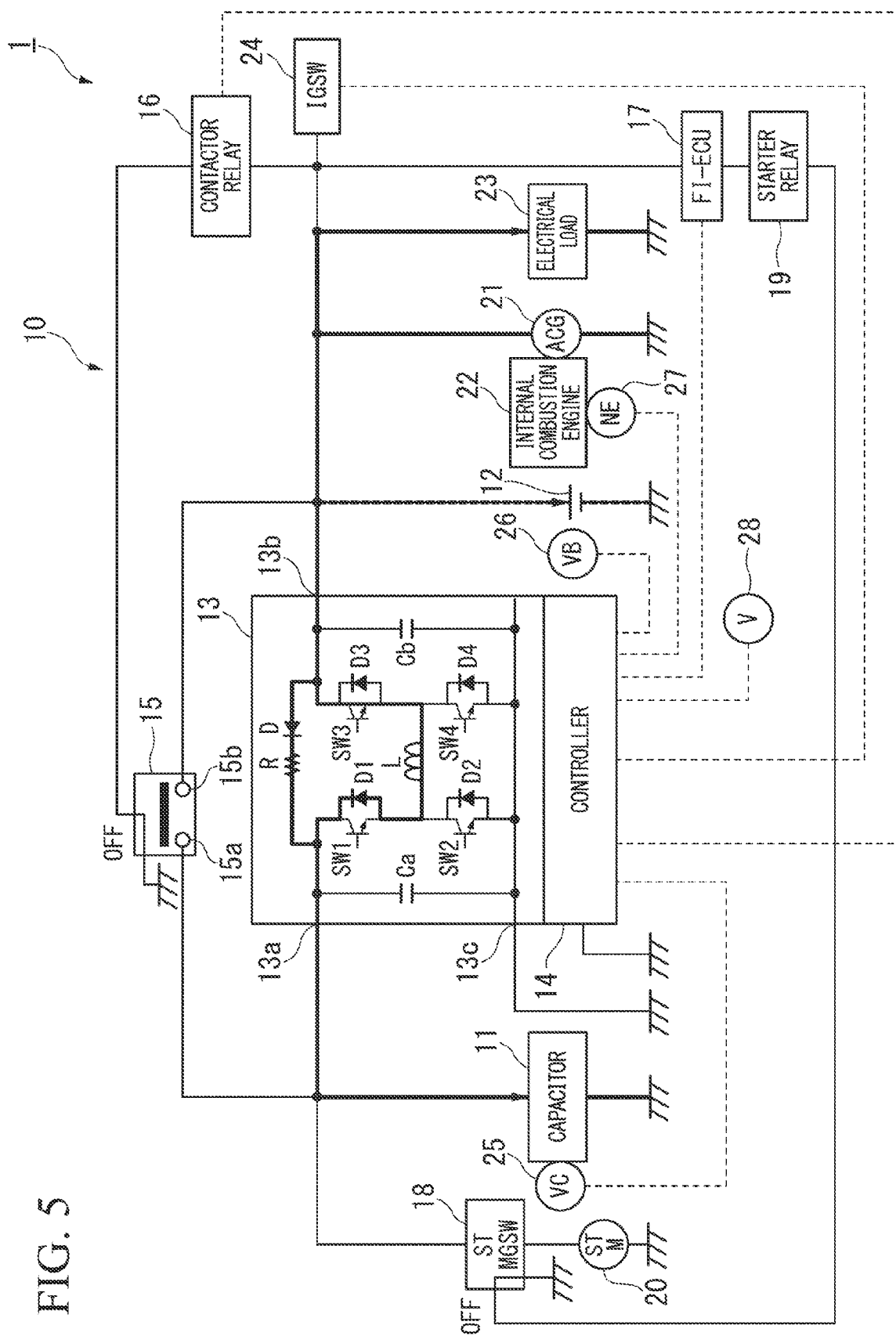
FIG. 5 is a view showing the flow of current in an I/S preliminary charging operating mode that is executed by the controller of the vehicle power supply device according to an embodiment of the present invention.

Next, when the vehicle 1 is in a running state other than deceleration, as is the case, for example, during the period from the timing t1 until the timing t2 shown in FIG. 2, if a command to execute an idle stop has not been given, the controller 14 executes the I/S preliminary charging operating mode M2. In this operating mode M2, as is shown in FIG. 5, the controller 14 charges the capacitor 11 by supplying power from the power generator 21 to the capacitor 11 via the DC-DC converter 13 using generated power that has been output from the power generator 21 which generates power using motive power from the internal combustion engine 22 when this is running. Furthermore, the controller 14 also supplies power from the power generator 21 to the electrical load 23, and supplies power from the power generator 21 to the battery 12 in accordance with the condition of the battery 12.

More specifically, the controller 14 places the contactor 15 in a disconnected state by turning off the contactor relay 16, and places the starter magnet switch 18 in a disconnected state by turning off the starter relay 19. The controller 14 causes current to flow to the diode D and the resistor R between the second input/output terminal 13b and the first input/output terminal 13a of the DC-DC converter 13, and causes current to flow to the third switching element SW3, which has been turned on, the reactor L (i.e., the coil L), and the first diode D1. In preparation for executing an idle stop, the controller 14 then charges the capacitor 11 with sufficient power to restart the internal combustion engine 22, and continues to charge the capacitor 11 until at least the output voltage of the capacitor 11 reaches a predetermined I/S preliminary potential.

Note that this predetermined I/S preliminary potential is an output voltage that corresponds to a residual capacity SOC in the capacitor 11 that enables it to supply the necessary power to the electrical load 23 and the like when the internal combustion engine 22 is in a temporary stop state that extends for a predetermined period due to an idle stop.

Figure 6:
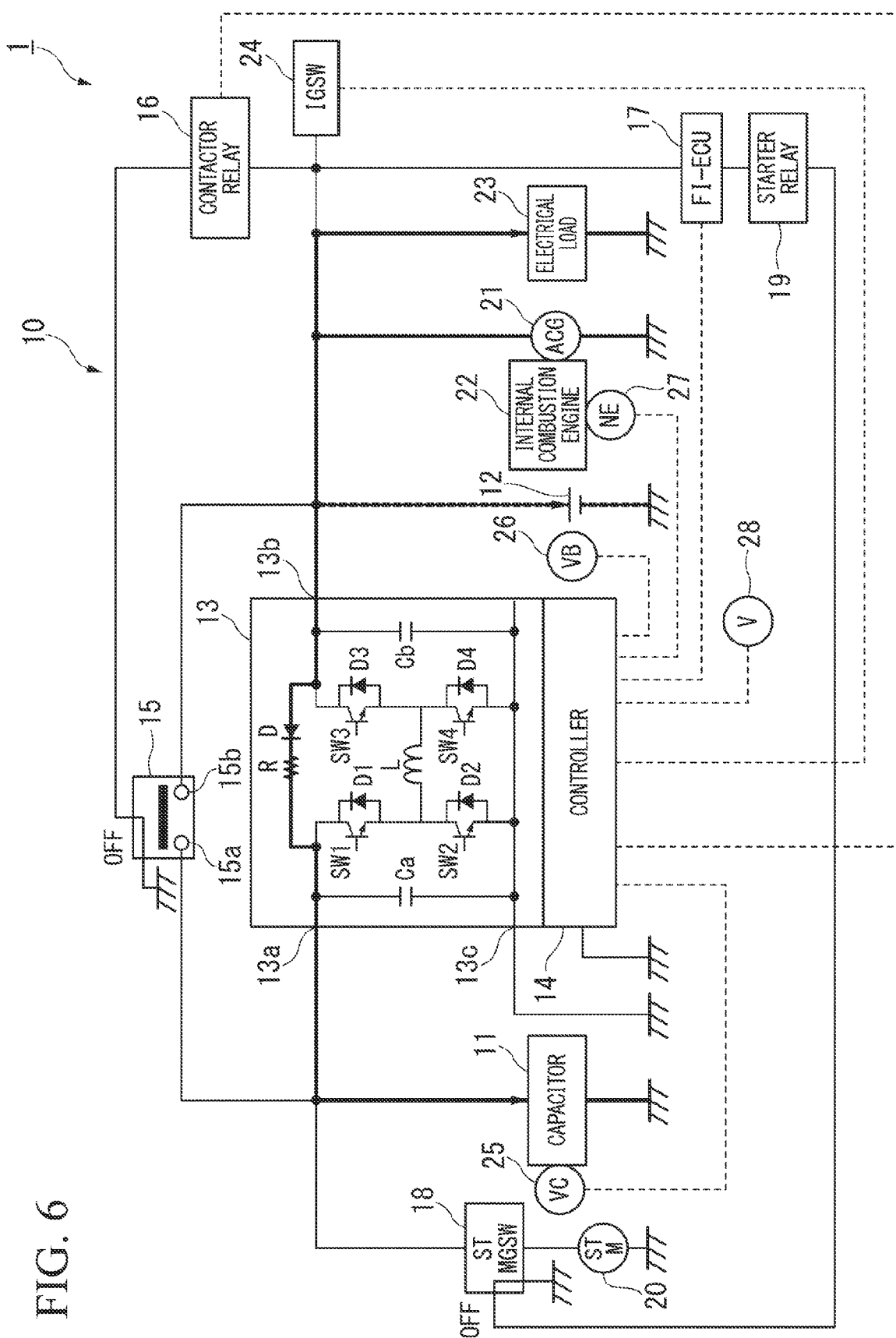
FIG. 6 is a view showing the flow of current when the output voltage from a capacitor 11 has reached a predetermined I/S preliminary potential in the I/S preliminary charging operating mode that is executed by the controller of the vehicle power supply device according to an embodiment of the present invention.

Furthermore, as is the case, for example, during the period from the timing t2 until the timing t3 shown in FIG. 2, when the vehicle 1 is in a running state other than deceleration, and a command to execute an idle stop has not been given, and the output voltage from the capacitor 11 has reached the predetermined I/S preliminary potential, then the controller 14 continues to execute the I/S preliminary charging operating mode M2. In this case, as is shown in FIG. 6, the controller 14 causes current to flow to the diode D and the resistor R by switching the third switching element SW3 from on to off between the second input/output terminal 13b and the first input/output terminal 13a of the DC-DC converter 13. By doing this, the controller 14 keeps the output voltage from the capacitor at 11 at the predetermined I/S preliminary potential.

Figure 7:
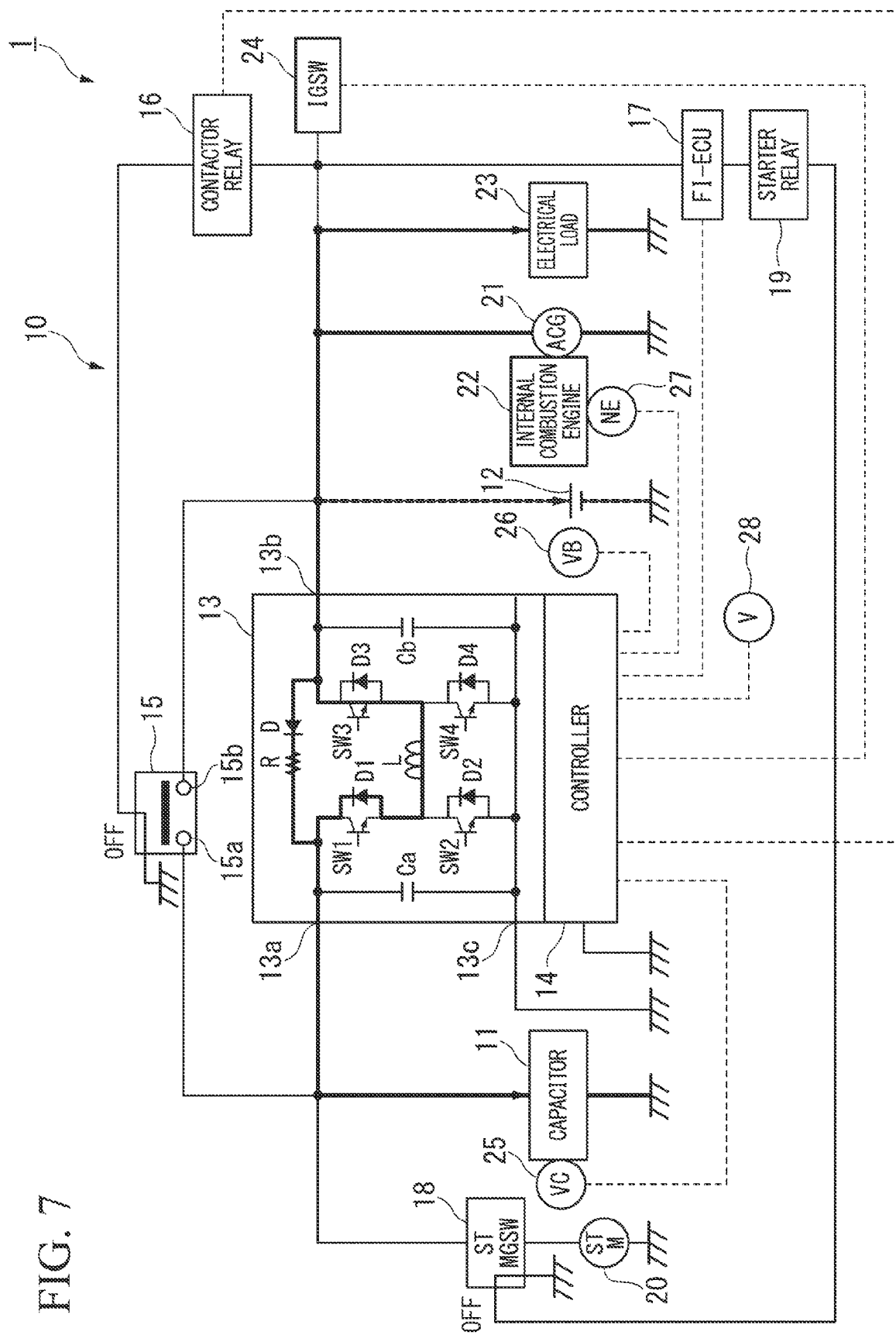
FIG. 7 is a view showing the flow of current in a regenerative charging operating mode that is executed by the controller of the vehicle power supply device according to an embodiment of the present invention.

Next, when the supplying of fuel is stopped while the vehicle 1 is decelerating or the like, as is the case, for example, from the timing t3 until the timing t4 shown in FIG. 2, the controller 14 executes the regenerative charging operating mode M3. In this operating mode M3, as is shown in FIG. 7, the controller 14 charges the capacitor 11 by supplying power from the power generator 21 to the capacitor 11 via the DC-DC converter 13 using the regenerative power that is output from the power generator 21 when the vehicle 1 is decelerating or the like. Furthermore, the controller 14 also supplies power from the power generator 21 to the electrical load 23, and supplies power to the battery 12 from the power generator 21 in accordance with the condition of the battery 12. The controller 14 generates regenerative power by converting the kinetic energy of the vehicle that is transmitted from a drive wheel (not shown) of the vehicle 1 into electrical energy (i.e., regenerative energy) using the power generator 21.

More specifically, the controller 14 places the contactor 15 in a disconnected state by turning off the contactor relay 16, and places the starter magnet switch 18 in a disconnected state by turning off the starter relay 19. The controller 14 causes current to flow to the diode D and the resistor R between the second input/output terminal 13b and the first input/output terminal 13a of the DC-DC converter 13, and causes current to flow to the third switching element SW3, which has been turned on, the reactor L (i.e., the coil L), and the first diode D1. The controller 14 then charges the capacitor 11 within a range such that at least the output voltage of the capacitor 11 is equal to or less than a predetermined upper-limit potential.

Note that this predetermined upper-limit potential is an output voltage that is greater than the I/S preliminary potential and corresponds, for example, to a fully charged state (in other words, when the residual capacity SOC=100%).

Figure 8:
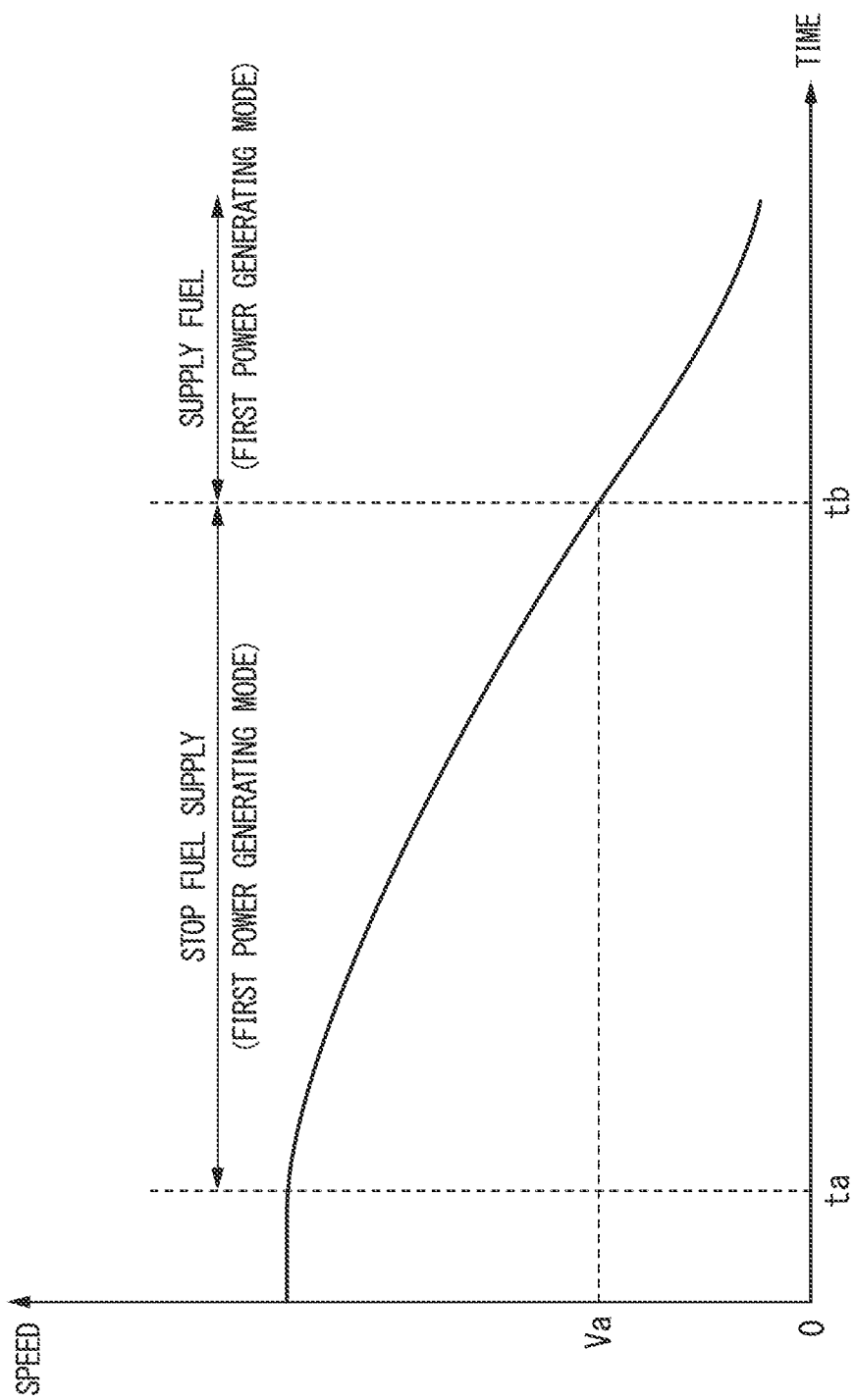
FIG. 8 is a view showing an example of an interrelationship between whether or not the supply of fuel to an internal combustion engine has been stopped, the state of deceleration of a vehicle, and the operating mode of a power generator in the regenerative charging operating mode that is executed by the controller of the vehicle power supply device according to an embodiment of the present invention.

In this operating mode M3, as is shown, for example, in FIG. 8, the controller 14 causes the power generator 21 to operate in the first power generating mode when the speed of the vehicle 1 that has been detected by the speed sensor 28 is greater than a predetermined speed Va at the timing ta, which is when it is determined that the supply of fuel to the internal combustion engine 22 has stopped as the vehicle 1 begins to decelerate. In this case, the controller 14 charges the capacitor 11 by supplying power from the power generator 21 to the capacitor 11 via the DC-DC converter 13 using regenerative power that is output from the power generator 21.

Moreover, at, and subsequent to, the timing tb, which is when it is determined that the stopping of the fuel supply to the internal combustion engine 22 has been cancelled due to the engine revolution speed reaching a predetermined revolution speed (for example, an idling revolution speed) in conjunction with the speed of the vehicle 1 dropping to the predetermined speed Va, if possible, the power generator 21 is kept in the first power generating mode. In this case, the controller 14 is able to charge the capacitor 11 by supplying power from the power generator 21 to the capacitor 11 via the DC-DC converter 13 using regenerative power that is output from the power generator 21.

Namely, in the state of deceleration when the speed of the vehicle 1 has dropped to the predetermined speed Va immediately prior to stopping, by keeping the power generator 21 in the first power generating mode even when the stopping of the fuel supply to the internal combustion engine 22 is canceled, the deceleration due to engine braking is maintained.

Moreover, when it is determined that the fuel supply to the internal combustion engine 22 has been stopped, the controller 14 sets the output voltage from the capacitor 11 to a first voltage, and when it is determined that the fuel supply to the internal combustion engine 22 has not been stopped, the controller 14 sets the output voltage from the capacitor 11 to a second voltage that is smaller than the first voltage. When the controller 14 is changing the output voltage from the capacitor 11 from the first voltage to the second voltage, it charges the battery 12 by supplying power obtained from the difference between the first voltage and the second voltage from the capacitor 11 to the battery 12 via the DC-DC converter 13.

Note that if it is determined that the fuel supply to the internal combustion engine 22 has not been stopped, then it is also possible for the capacitor 11 to be placed in a standby state (namely, a state in which both charging and discharging are prohibited).

Figure 9:
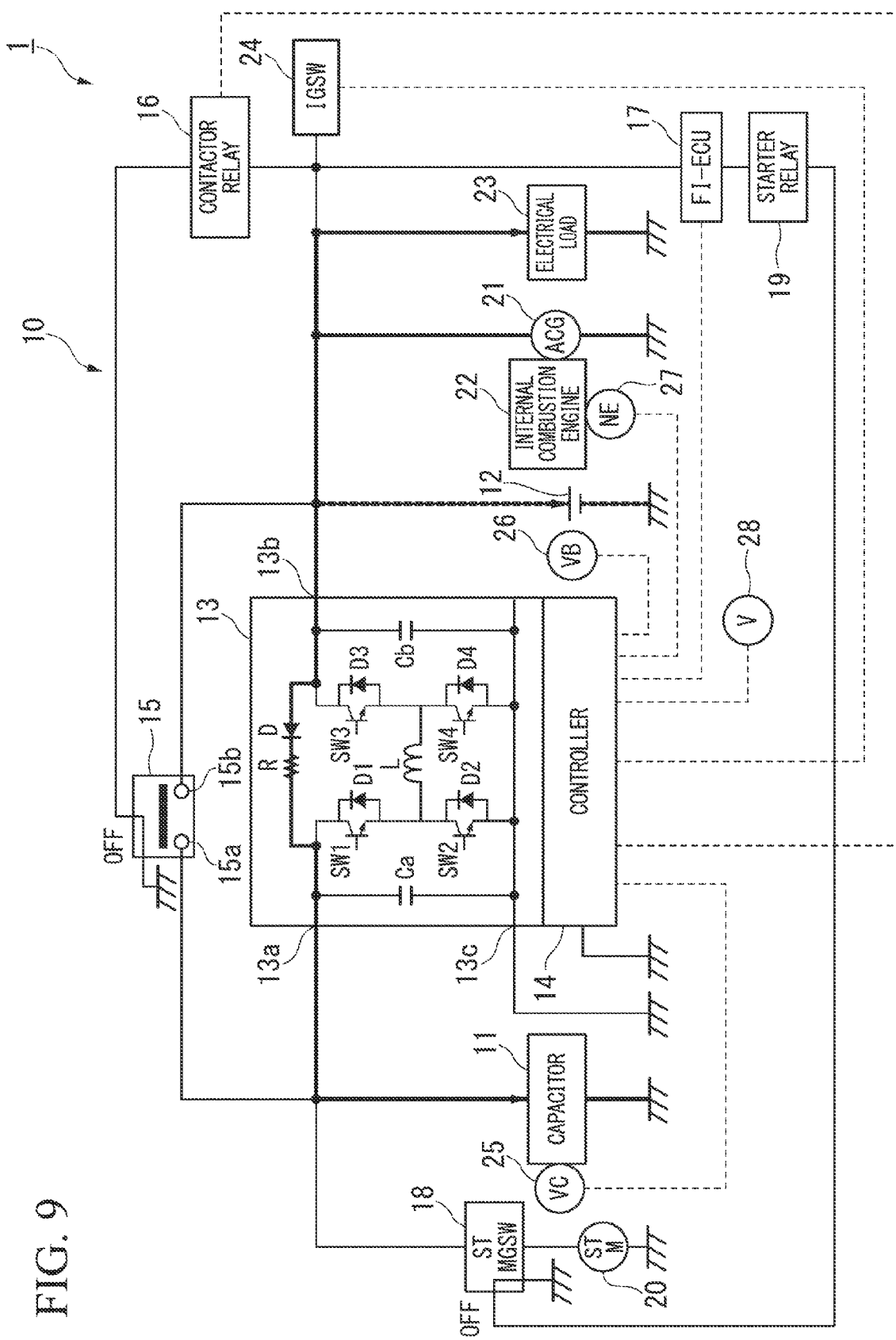
FIG. 9 is a view showing the flow of current when the output voltage from the capacitor 11 has reached a predetermined upper-limit potential in the regenerative charging operating mode that is executed by the controller of the vehicle power supply device according to an embodiment of the present invention.

Furthermore, when the fuel supply is stopped while the vehicle 1 is decelerating or the like, then when the output voltage from the capacitor 11 has reached the predetermined upper-limit potential, the controller 14 continues to execute the regenerative charging operating mode M3. In this case, as is shown in FIG. 9, the controller 14 causes current to flow to the diode D and the resistor R by switching the third switching element SW3 from on to off between the second input/output terminal 13b and the first input/output terminal 13a of the DC-DC converter 13. By doing this, the controller 14 keeps the output voltage from the capacitor at 11 at the predetermined upper-limit potential.

Figure 10:
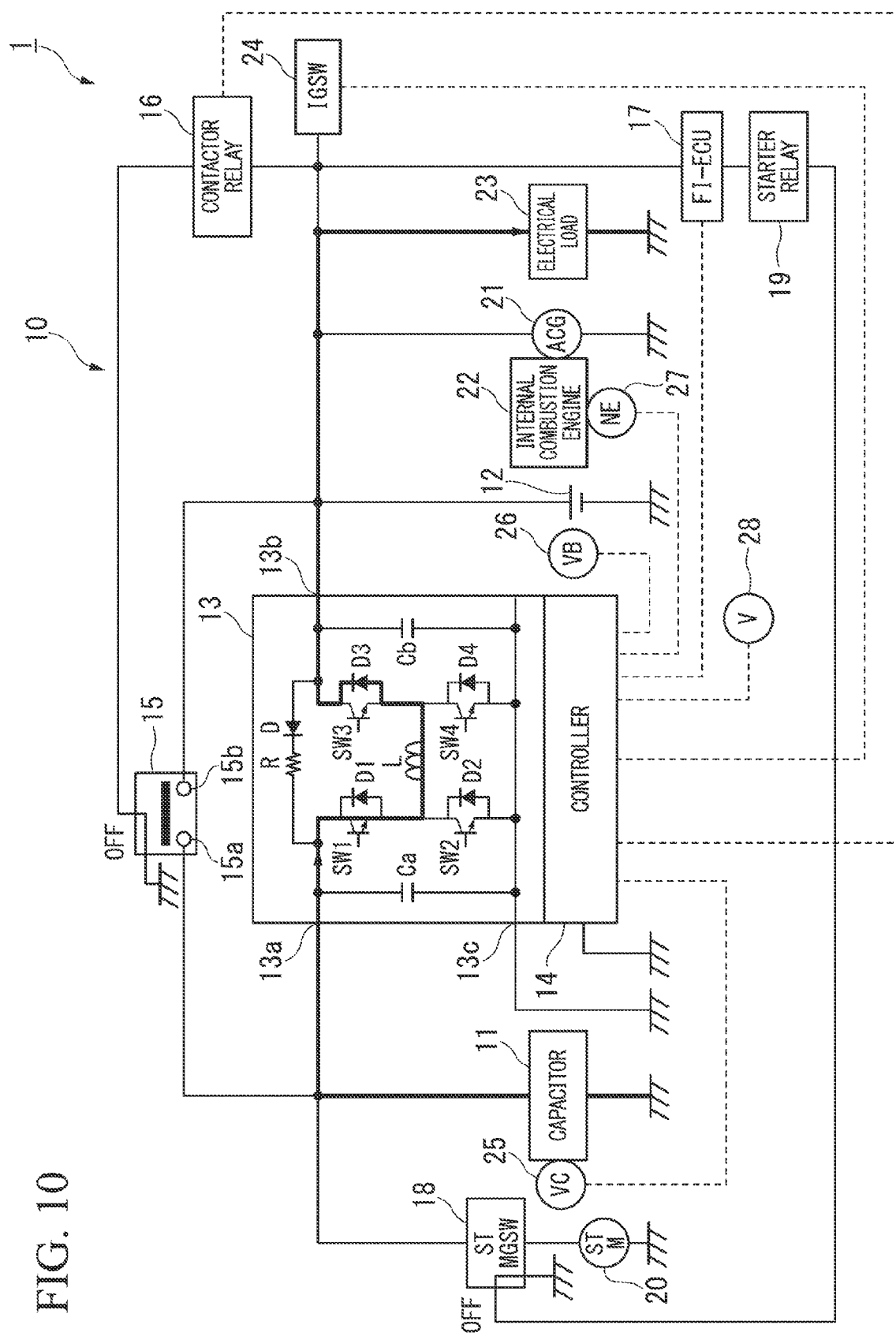
FIG. 10 is a view showing the flow of current in a regenerative discharging operating mode that is executed by the controller of the vehicle power supply device according to an embodiment of the present invention.

Next, when the vehicle 1 is traveling at a constant speed, as is the case, for example, during the period from the timing t4 until the timing t5 shown in FIG. 2, and a command to execute an idle stop has not been given, the controller 14 executes the regenerative discharge operating mode M4. In this operating mode M4, as is shown in FIG. 10, the controller 14 causes the capacitor 11 to discharge power by supplying power from the capacitor 11 to the electrical load 23 via the DC-DC converter 13 using the regenerative power in excess of the predetermined I/S preliminary potential that has accumulated in the capacitor 11.

More specifically, the controller 14 places the contactor 15 in a disconnected state by turning off the contactor relay 16, and places the starter magnet switch 18 in a disconnected state by turning off the starter relay 19. The controller 14 causes current to flow to the first switching element SW1, which has been turned on, the reactor L (i.e., the coil L), and the third diode D3 between the first input/output terminal 13a and the second input/output terminal 13b of the DC-DC converter 13. The controller 14 then discharges the capacitor 11 until at least the output voltage of the capacitor 11 reaches the predetermined I/S preliminary potential. At this time, the controller 14 pauses the power generation and regeneration of the power generator 21, or else sets the output voltage from the power generator 21 to a lower voltage than the voltage prescribed during normal operations.

Figure 11:
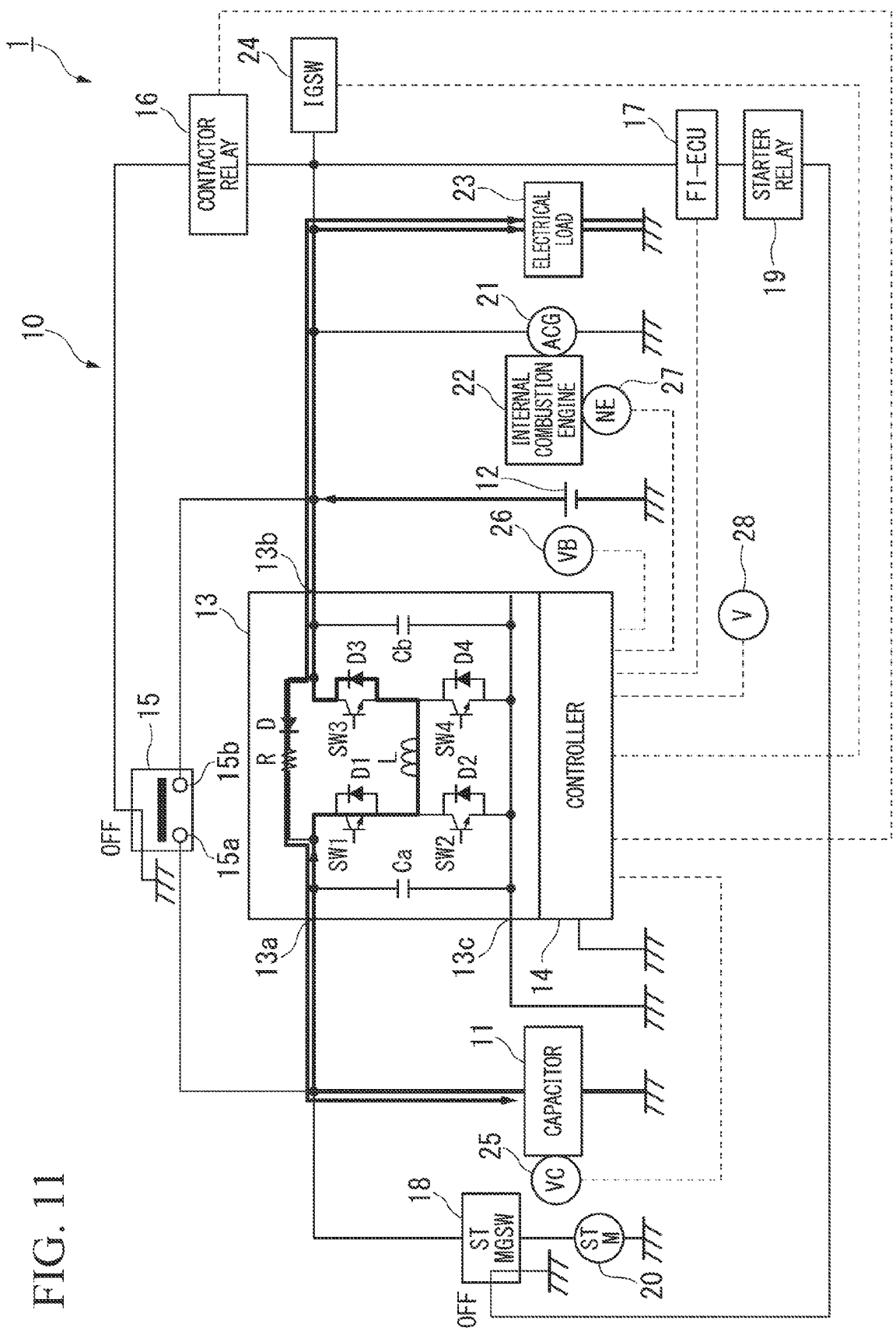
FIG. 11 is a view showing the flow of current in an I/S power supply (Capacitor) operating mode that is executed by the controller of the vehicle power supply device according to an embodiment of the present invention.

Next, when the vehicle 1 is parked (i.e., has zero acceleration), as is the case, for example, during the period from the timing t6 until the timing t7 shown in FIG. 2, and an idle stop has been executed, the controller 14 executes the I/S power supply (Capacitor) operating mode M5. In this operating mode M5, as is shown in FIG. 11, when the internal combustion engine 22 has been temporarily stopped due to the vehicle 1 being in an idle stop state, the controller 14 causes the capacitor 11 to discharge power by supplying power from the capacitor 11 to the electrical load 23 via the DC-DC converter 13 using the power in excess of a predetermined I/S lower-limit potential that has accumulated in the capacitor 11.

More specifically, the controller 14 places the contactor 15 in a disconnected state by turning off the contactor relay 16, and places the starter magnet switch 18 in a disconnected state by turning off the starter relay 19. The controller 14 causes current to flow to the first switching element SW1, which has been turned on, the reactor L (i.e., the coil L), and the third diode D3 between the first input/output terminal 13a and the second input/output terminal 13b of the DC-DC converter 13. The controller 14 then causes the capacitor 11 to discharge power until at least the output voltage of the capacitor 11 reaches a predetermined I/S lower-limit potential, while ensuring that sufficient power is retained to restart the internal combustion engine 22 in the event that a restore request is made.

Note that the predetermined I/S lower-limit potential is an output voltage that is smaller than the I/S preliminary potential and corresponds, for example, to a residual capacity SOC that makes it possible to execute a suitable power supply to restart the temporarily stopped internal combustion engine 22 using drive power from the starter motor 20. This suitable power supply from the capacitor 11 refers to power being discharged from the capacitor 11 without this causing the output voltage from the capacitor 11 to drop below a predetermined minimum safeguard potential. For this reason, as is shown in FIG. 11, in addition to supplying power from the battery 12 to the electrical load 23, the controller 14 is able to charge the capacitor 11 by supplying power to the capacitor 11 from the battery 12 via the diode D and the resistor R of the DC-DC converter 13. As a result of this, the controller 14 prevents the output voltage from the capacitor 11 from dropping to less than the predetermined minimum safeguard potential. Note that this minimum safeguard potential is smaller than the I/S lower-limit potential, and, for example, is the output voltage that is required in order to maintain the capacitor 11 in the proper state.

Figure 12:
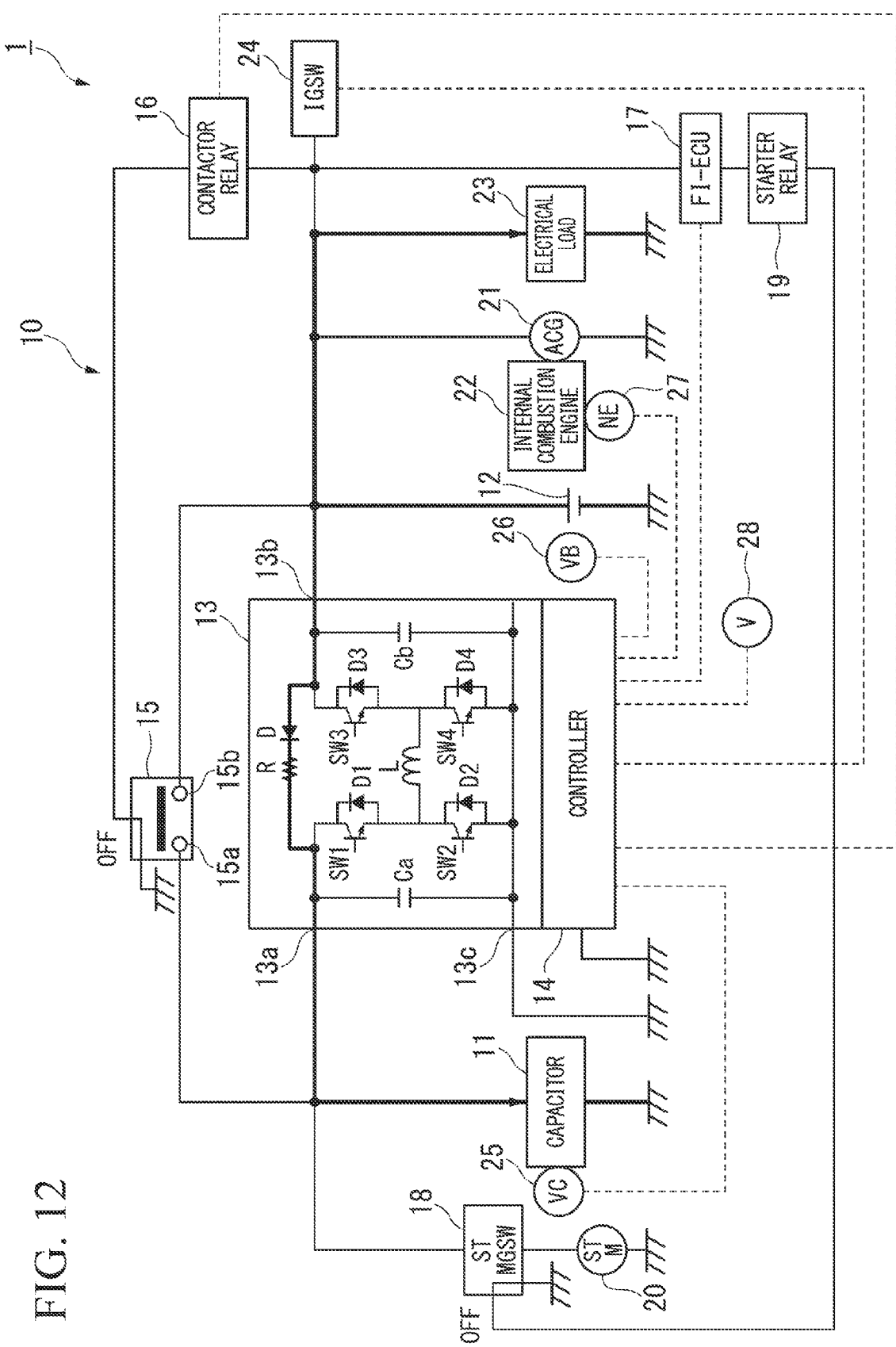
FIG. 12 is a view showing the flow of current in an I/S power supply (BATT) operating mode that is executed by the controller of the vehicle power supply device according to an embodiment of the present invention.

Next, when the vehicle 1 is parked (i.e., has zero acceleration), as is the case, for example, during the period from the timing t7 through to a point immediately prior to the timing t8 shown in FIG. 2, and is in an idle stop state, and the output voltage from the capacitor 11 has reached the predetermined I/S lower-limit potential, the controller 14 executes the I/S power supply (BATT) operating mode M6. In this operating mode M6, as is shown in FIG. 12, when the internal combustion engine 22 is temporarily stopped due to the vehicle 1 being in an idle stop state, the controller 14 charges the capacitor 11 by supplying power from the battery 12 to the capacitor 11 via the DC-DC converter 13 using the power that has accumulated in the battery 12. Furthermore, the controller 14 also supplies power from the battery 12 to the electrical load 23.

More specifically, the controller 14 places the contactor 15 in a disconnected state by turning off the contactor relay 16, and places the starter magnet switch 18 in a disconnected state by turning off the starter relay 19. The controller 14 switches the first switching element SW1 from the turned-on state to the turned-off state and causes current to flow to the diode D and the resistor R between the second input/output terminal 13b and the first input/output terminal 13a of the DC-DC converter 13. By doing this, the controller 14 maintains the output voltage of the capacitor 11 at the predetermined I/S lower-limit potential, while prohibiting any power discharge from the capacitor 11 which is securely holding the minimum amount of power that is necessary for the internal combustion engine 22 to be restarted in response to a restore request.

Figure 13:
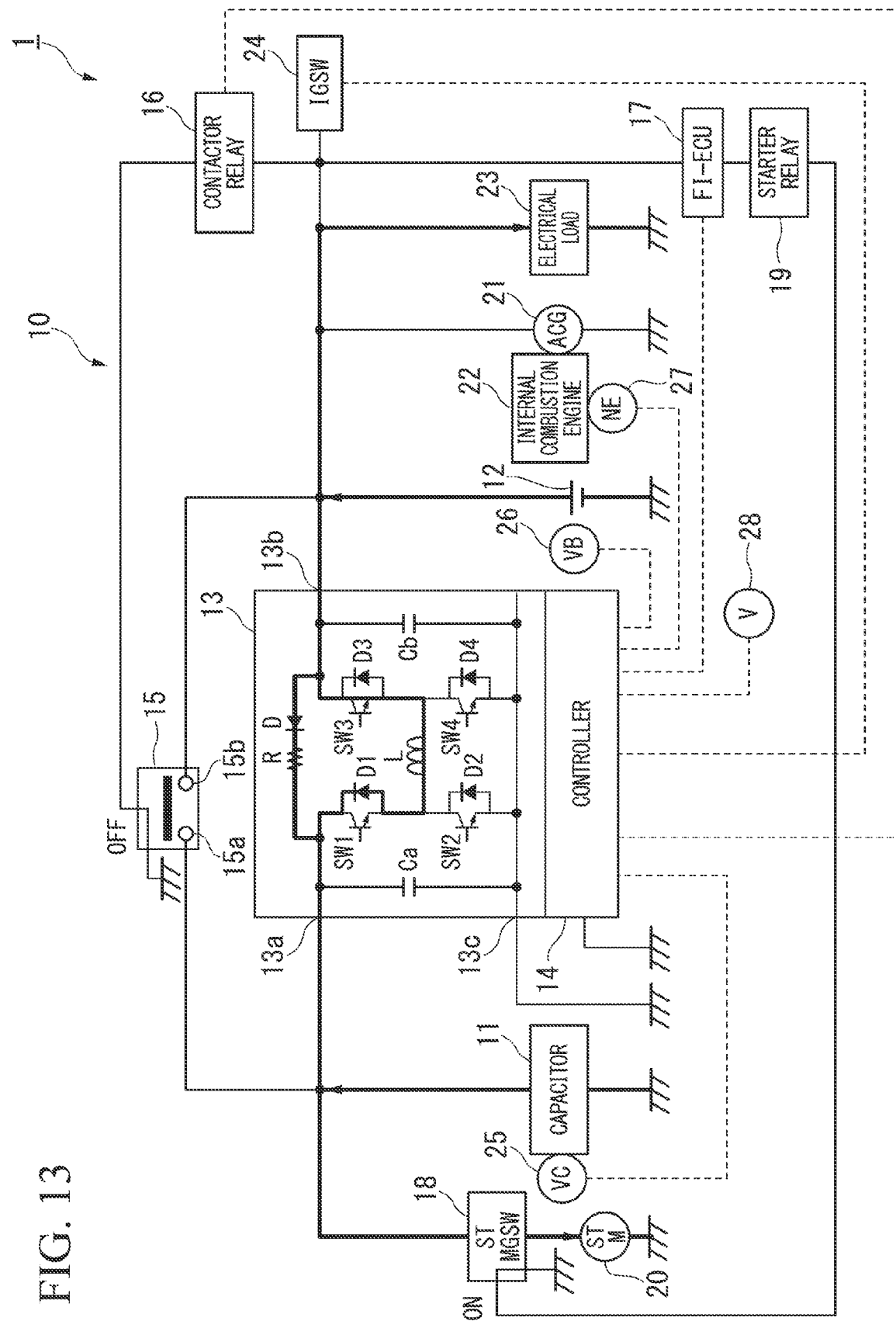
FIG. 13 is a view showing the flow of current in an ENG restart operating mode that is executed by the controller of the vehicle power supply device according to an embodiment of the present invention.

Next, when the controller 14 receives a restore request requesting that the internal combustion engine 22, which is currently in a temporary stop state due to the idle stop be restarted, as is the case, for example, at the timing t8 shown in FIG. 2, it executes the ENG restart operating mode M7. In this operating mode M7, as is shown in FIG. 13, the controller 14 places the contactor 15 in a disconnected state by turning off the contactor relay 16, and places the starter magnet switch 18 in a connected state by turning on the starter relay 19. The controller 14 drives the starter motor 20 by supplying power solely from the capacitor 11, which is connected in parallel, to the starter magnet switch 18 and starter motor 20, which are connected in series, and thus causes the internal combustion engine 22 to restart using drive force from the starter motor 20.

The controller 14 supplies power from the battery 12 to the electrical load 23, and also charges the capacitor 11 by supplying power to the capacitor 11 from the battery 12 via the DC-DC converter 13. Because of this, even if the output voltage from the capacitor 11 and the residual capacity SOC decrease as a result of power being supplied from the capacitor 11 to the starter motor 20, the controller 14 prevents the output voltage from the capacitor 11 from falling below the predetermined minimum safeguard potential.

Figure 14:
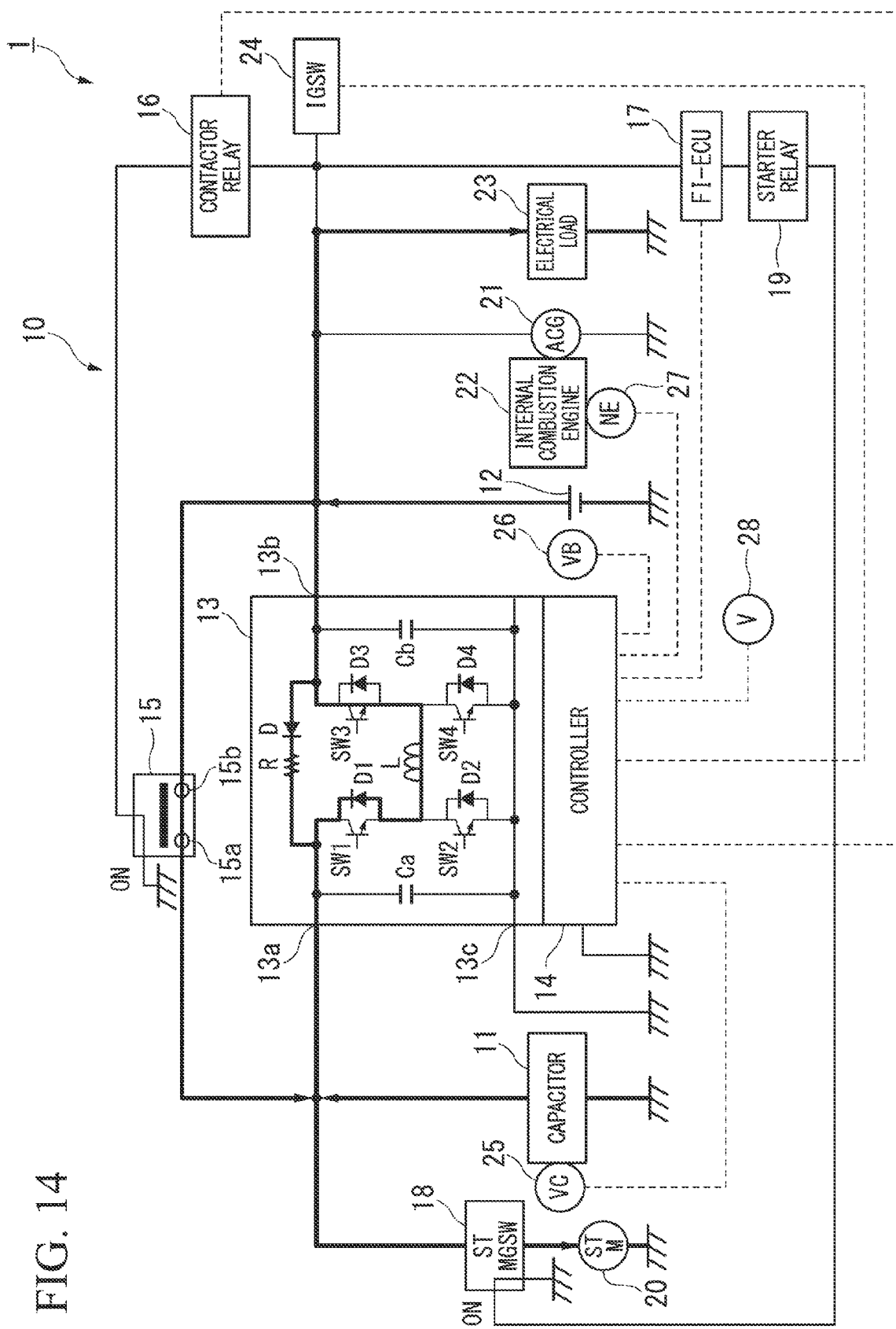
FIG. 14 is a view showing the flow of current when contactors have been placed in a state of connection in the ENG restart operating mode that is executed by the controller of the vehicle power supply device according to an embodiment of the present invention.

Note that when the controller 14 has executed the ENG restart operating mode M7, as is the case, for example, at the timing t8 shown in FIG. 2, if it is unable to restart the internal combustion engine 22 by supplying power to the starter motor 20 solely from the capacitor 11, as is shown in FIG. 14, it places the contactor 15 in a connected state by turning on the contactor relay 16. By doing this, the controller 14 drives the starter motor 20 with power supplied from both the capacitor 11 and the battery 12, and causes the internal combustion engine 22 to restart using the drive power from the starter motor 20.

If, when a predetermined time has elapsed since the commencement of the restarting of the internal combustion engine 22, the number of revolutions (i.e., an engine revolution number NE) of the internal combustion engine 22 that is detected by the revolution sensor 27 is less than a predetermined number of revolutions, or if it receives a signal output from the FI-ECU 17 showing an internal combustion engine 22 start error, the controller 14 determines that it was not able to restart the internal combustion engine 22.

Once the controller 14 has restarted the internal combustion engine 22 by turning on the contactor relay 16, it prohibits the next idle stop from being executed. Note that, irrespective of whether or not it has restarted the internal combustion engine 22 by turning on the contactor relay 16, it is also possible for the controller 14 to prohibit the next idle stop from being executed if it calculates the accumulated number of restarts and this accumulated number is equal to or greater than a predetermined number (for example, one). Moreover, when the controller 14 has restarted the internal combustion engine 22 by turning on the contactor relay 16, then if the output voltage from the battery 12 falls to a predetermined lower-limit voltage or less, the controller 14 may also prohibit the next idle stop from being executed.

Next, when the vehicle 1 is in a running state other than deceleration, as is the case, for example, during the period from the timing t8 until the timing t9 shown in FIG. 2, if a command to execute an idle stop has not been given, the controller 14 executes the above-described I/S preliminary charging operating mode M2.

Figure 15:
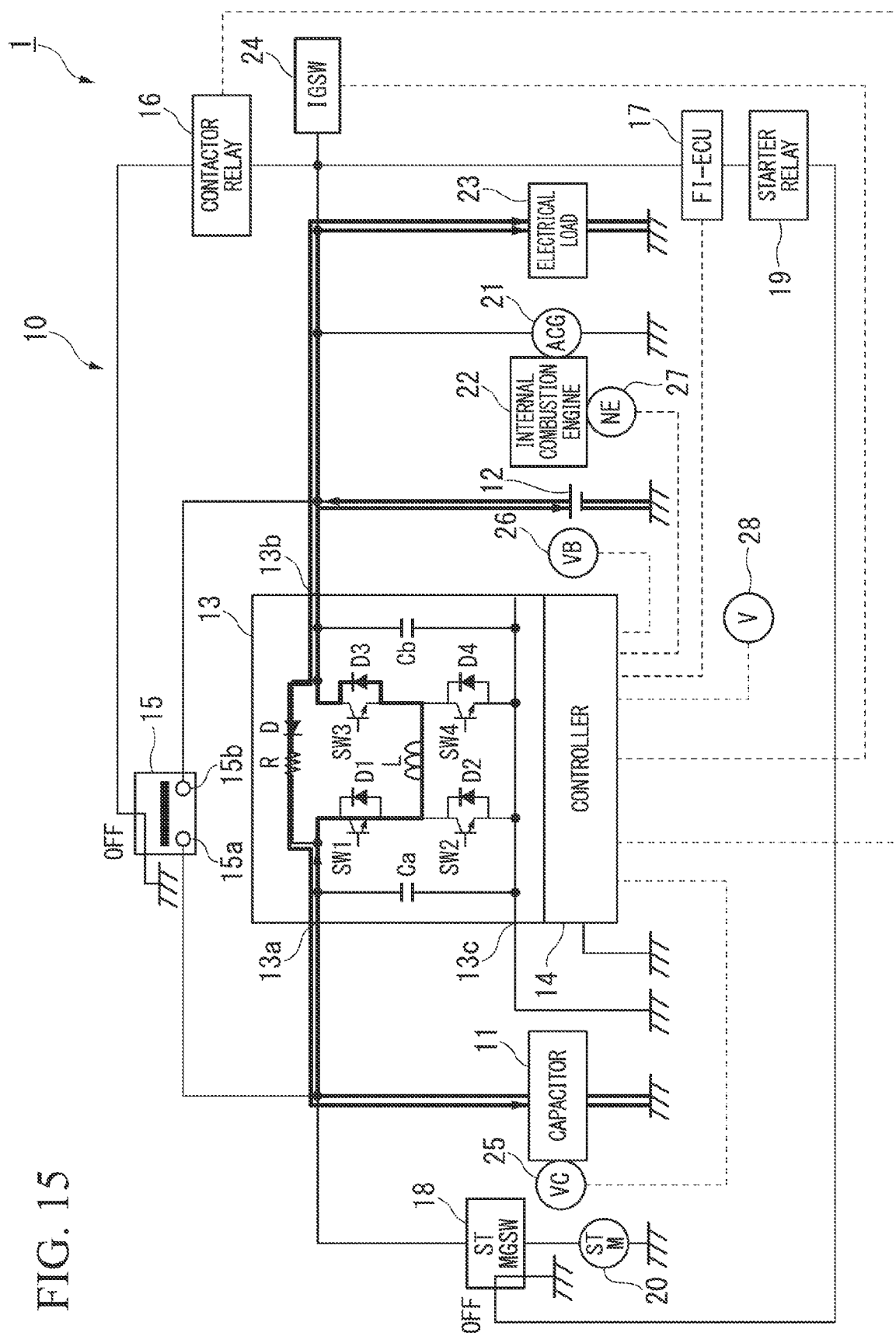
FIG. 15 is a view showing the flow of current in an operating mode when the vehicle is parked that is executed by the controller of the vehicle power supply device according to an embodiment of the present invention.

Next, the controller 14 executes the vehicle 1 parking operating mode M8 for a predetermined period starting from when the ignition switch 24 was switched from on to off. In this operating mode M8, as is shown in FIG. 15, the controller 14 places the contactor 15 in a disconnected state by turning off the contactor relay 16, and places the starter magnet switch 18 in a disconnected state by turning off the starter relay 19. The controller 14 then causes the capacitor 11 to discharge power by supplying power from the capacitor 11 to the battery 12 and electrical load 23 via the DC-DC converter 13, and thereby suppresses any deterioration in the capacitor 11 while the vehicle 1 is parked. More specifically, the controller 14 causes current to flow to the first switching element SW1, which has been turned on, the reactor L (i.e., the coil L), and the third diode D3 between the first input/output terminal 13a and the second input/output terminal 13b of the DC-DC converter 13.

Note that in order to prevent the output voltage from the capacitor 11 falling to less than the predetermined minimum safeguard potential while the vehicle 1 is parked, in addition to supplying power from the battery 12 to the electrical load 23, the controller 14 charges the capacitor 11 by supplying power to the capacitor 11 from the battery 12 via the diode D and the resistor R of the DC-DC converter 13.

When the ignition switch 24 has been turned off and the vehicle 1 is parked, the controller 14 cancels the prohibition on the next execution of the idle stop which requires the internal combustion engine 22 to be restarted by the drive of the starter motor 20 (namely, it cancels the prohibition on the starter motor 20 being driven).

As has been described above, according to the vehicle power supply device 10 according to the present embodiment, even in a state of deceleration (for example, immediately prior to the vehicle 1 stopping) when the stopping of the fuel supply to the internal combustion engine 22 has been canceled, the controller 14 is still able to prevent engine braking from decreasing by causing the power generator 21 to operate in a first power generating mode. As a result of this, it is possible, for example, to prevent any brake heat from being generated as a result of the brakes being used in place of engine braking, and to thereby prevent any decrease in the amount of regenerative power that can be recovered by the power generator 21.

Furthermore, when the output voltage from the capacitor 11 is changed from the first voltage to the second voltage, the battery 12 is charged as a result of an amount of power equal to the difference between the first voltage and the second voltage being supplied from the capacitor 11 to the battery 12 via the DC-DC converter 13> Consequently, fuel consumption can be improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

For example, in the above-described embodiment, the DC-DC converter 13 is formed by an H-bridge voltage inverter type of DC-DC converter, however, the present invention is not limited to this and the DC-DC converter 13 may also be a voltage-boosting DC-DC converter having some other type of structure.

For example, in the above-described embodiment, the contactor 15 may also be some other type of switch.

For example, in the above-described embodiment, a deceleration of the vehicle 1 is detected via the speed thereof being detected by the speed sensor 28, however, the present invention is not limited to this and it is also possible for a deceleration of the vehicle 1 to be detected by the amount the brake pedal is depressed or like.

What is claimed is:

1. A vehicle power supply device that is mounted in a vehicle that is provided with an internal combustion engine, the device comprising:
a first power supply;
a second power supply that is connected in parallel to the first power supply;
a DC-DC converter that is connected between the first power supply and the second power supply;
a determination device that determines whether or not a fuel supply to the internal combustion engine has stopped;
a deceleration detecting device that detects a deceleration of the vehicle;
a power generator that is connected to the internal combustion engine; and
a control device that controls the DC-DC converter, wherein,
when it is determined by the determination device that the fuel supply to the internal combustion engine has stopped, the control device charges the second power supply using regenerative power that is generated by the power generator via the DC-DC converter, and,
when a deceleration of the vehicle is detected by the deceleration detecting device, and it is also determined by the determination device that the fuel supply to the internal combustion engine has not been stopped, the control device is able to charge the second power supply using regenerative power that is generated by the power generator via the DC-DC converter.

2. The vehicle power supply according to claim 1, wherein the power generator is able to operate in at least a first power generating mode and a second power generating mode that generates voltage that is smaller than the voltage generated in the first power generating mode, and operates in the first power generating mode when it is determined by the determination device that the fuel supply to the internal combustion engine has been stopped, and
wherein, when a deceleration of the vehicle is detected by the deceleration detecting device and it is also determined by the determination device that the fuel supply to the internal combustion engine has not been stopped, the control device causes the power generator to operate in the first power generating mode.

3. The vehicle power supply according to claim 1, wherein the control device sets the output voltage from the second power supply to a first voltage when it is determined by the determination device that the fuel supply to the internal combustion engine has stopped, and sets the output voltage from the second power supply to a second voltage which is smaller than the first voltage when it is determined by the determination device that the fuel supply to the internal combustion engine has not stopped, and,
when the control device changes the output voltage from the second power supply from the first voltage to the second voltage, the control device charges the first power supply by supplying power obtained from the difference between the first voltage and the second voltage to the first power supply.

4. The vehicle power supply according to claim 2, wherein
the control device sets the output voltage from the second power supply to a first voltage when it is determined by the determination device that the fuel supply to the internal combustion engine has stopped, and sets the output voltage from the second power supply to a second voltage which is smaller than the first voltage when it is determined by the determination device that the fuel supply to the internal combustion engine has not stopped, and, when the control device changes the output voltage from the second power supply from the first voltage to the second voltage, the control device charges the first power supply by supplying power obtained from the difference between the first voltage and the second voltage to the first power supply.

* * * * *